United States Patent
Kozuki et al.

[11] Patent Number: 5,194,997
[45] Date of Patent: Mar. 16, 1993

[54] DATA RECORDING APPARATUS HAVING SUB-CODE RECORDING FUNCTION

[75] Inventors: Susumu Kozuki, Tokyo; Katsuji Yoshimura; Toshiyuki Masui, both of Kanagawa, all of Japan

[73] Assignee: Canon Kabushiki Kaisha, Tokyo, Japan

[21] Appl. No.: 657,873

[22] Filed: Feb. 15, 1991

Related U.S. Application Data

[63] Continuation of Ser. No. 253,065, Oct. 10, 1988, abandoned.

[30] Foreign Application Priority Data

Oct. 6, 1987 [JP] Japan ............... 62-252824
Oct. 6, 1987 [JP] Japan ............... 62-252825
Oct. 6, 1987 [JP] Japan ............... 62-252826
Oct. 6, 1987 [JP] Japan ............... 62-252827

[51] Int. Cl.$^5$ ............................ G11B 5/09
[52] U.S. Cl. ............................ 360/48; 360/72.2
[58] Field of Search ............. 360/48, 72.2

[56] References Cited

U.S. PATENT DOCUMENTS 4,641,208 2/1987 Inazawa et al.
4,803,570 2/1989 Kashida et al. ............ 360/61
4,837,646 6/1989 Ozaki et al. ............ 360/72.2
4,853,803 8/1989 Fukatsu et al. ............ 360/72.2

Primary Examiner—Vincent P. Canney
Attorney, Agent, or Firm—Robin, Blecker, Daley & Driscoll

[57] ABSTRACT

A data recorder has a first recording mode in which a rotary head records, on a tape-shaped recording medium, main data related to main information by forming many parallel tracks in a first area of the medium which extends in the lengthwise direction of the medium; and a second recording mode in which the rotary head records on the medium only sub-code data which is other than the main data by repeatedly recording the sub-code data many times forming many parallel tracks in a second area which extends in the lengthwise direction of the medium and in parallel to the first area.

23 Claims, 9 Drawing Sheets

FIG.2(a)
FIG.2(b)
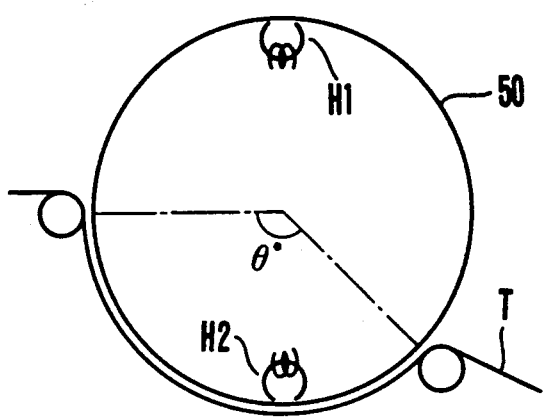
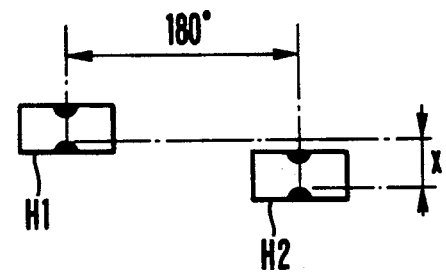
FIG.3
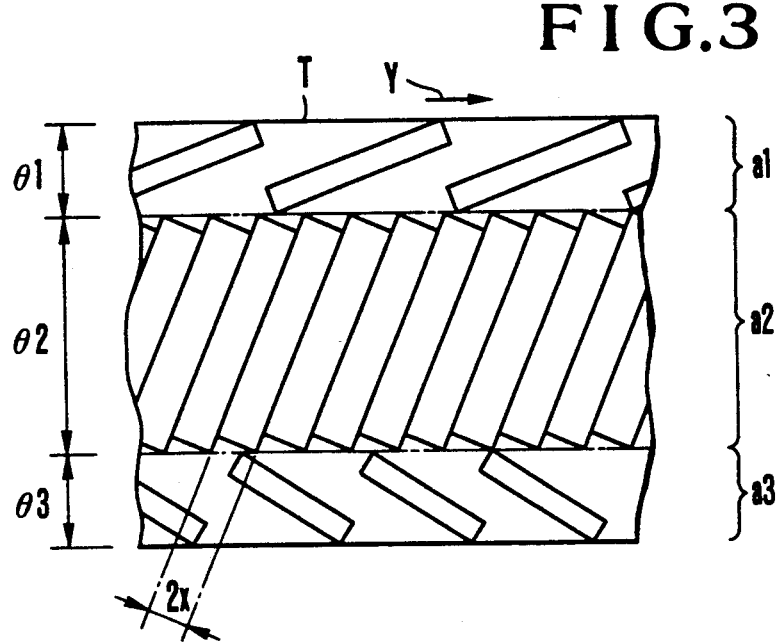
FIG.4(a)
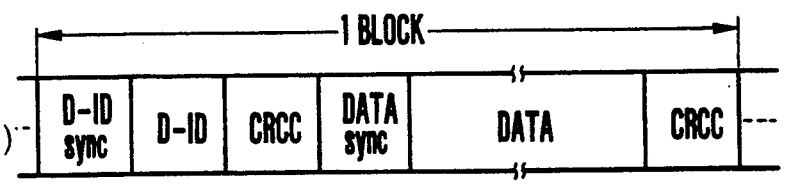
FIG.4(b)
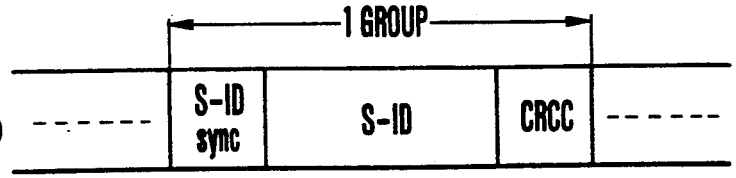

DATA RECORDING APPARATUS HAVING SUB-CODE RECORDING FUNCTION

This is a continuation application under 37 CFR 1.62 of prior application Ser. No. 253,065, filed Oct. 10, 1988 now abandoned.

BACKGROUND OF THE INVENTION

1. Field of the Invention

This invention relates to a data recording apparatus and more particularly to an apparatus which records sub-code data along with main data on a tape-shaped recording medium by means of a rotary head.

2. Description of the Related Art

There are two kinds of recorders for recording and reproducing digital data. One uses a disc-shaped recording medium, such as a floppy disc, and the other a tape-shaped recording medium. Recorders designed for home use which does not require a large amount of data mainly use a disc-shaped recording medium which permits easy retrieval of data. Recorders designed for business use which require a capacity of handling a large amount of data mainly use a tape-shaped recording medium.

Data recorders being used as data banks for computers of large capacity are arranged to record data on a tape-shaped recording medium with a fixed head. Meanwhile, large amounts of data such as image information have come to be more often handled during recent years. As a result, demand has arisen for a home-use recorder that is capable of handling a large amount of data. The above stated data recorder using a fixed head is hardly suited for home use because of the large quantity of tape to be used and the large size of the apparatus.

In view of this, compact recorders for recording and reproducing data on and from tape-shaped recording media by rotary heads have recently been proposed.

However, the rotary head type data recorder of this kind has presented the following problem: The use of a tape-shaped recording medium requires an extremely long tape access time in picking up desired data. Since there is no absolute address, data cannot be readily erased or renewed as desired. In other words, data cannot be easily edited. To solve this problem, it has been proposed to record some sub-data (hereinafter referred to as ID data) for various retrieval operations along with main data to be recorded by the rotary head. However, it is not easy to detect the desired ID data provided for retrieval with the tape allowed to travel at a high speed. If the tape is allowed to travel at a lowered speed, the length of time required for retrieval would become too long. Therefore, editing work on such data still remains difficult.

SUMMARY OF THE INVENTION

It is therefore an object of this invention to provide a data recorder which facilitates data editing.

It is another object of the invention to provide a data recorder which enables a retrieval operation on data to be accomplished within a short period of time.

Under this object, a data recording apparatus which is arranged as an embodiment of this invention comprises: a cylinder member provided with a rotary head; transport means for transporting a tape-shaped recording medium in the lengthwise direction thereof, the tape-shaped recording medium being wrapped around the cylinder member; means for generating main data related to main information; means for generating sub-code data related to sub-information which is other than the main information; and mode changeover means for changing over the apparatus between a plurality of modes thereof, the plurality of modes including: a first recording mode in which the main data is recorded in many parallel tracks formed by the rotary head at a first area extending in the lengthwise direction of the tape-shaped recording medium; and a second recording mode in which the sub-code data is repeatedly recorded a plurality of times in each of many parallel tracks formed by the rotary head at a second area extending in the lengthwise direction of the tape-shaped recording medium and in parallel to the first area.

It is a further object of the invention to provide a data recorder which is arranged to permit data retrieval to be accurately and reliably accomplished.

Under that object, a data recording apparatus which is arranged as an embodiment of the invention comprises: a cylinder member provided with a rotary head; transport means for transporting a tape-shaped recording medium in the lengthwise direction thereof, the tape-shaped recording medium being wrapped around the cylinder member; clock signal generating means for generating a master clock signal for determining a frequency of generating digital data; and mode changeover means for changing over the apparatus between a plurality of modes thereof, the plurality of modes including: a first recording mode in which the transport means transports the tape-shaped recording medium at a first speed, and first digital data formed on the basis of a first clock signal generated by the clock signal generating means is recorded in many parallel tracks formed by the rotary head at a first area extending in the lengthwise direction of the tape-shaped recording medium; and a second recording mode in which the transport means transports the tape-shaped recording medium at a second speed which is faster than the first speed, and second digital data formed on the basis of a second clock signal generated by the clock signal generating means and having a frequency set to have the same wave length as the first clock signal on the recording medium is recorded in many parallel tracks formed by the rotary head at a second area extending in the lengthwise direction of the tape-shaped recording medium and in parallel to the first area.

These and other objects and features of the invention will become apparent from the following detailed description of embodiments thereof taken in connection with the accompanying drawings.

BRIEF DESCRIPTION OF THE DRAWINGS

FIGS. 2(a) and 2(b) show the arrangement and location of heads of the data recorder of FIG. 1. FIG. 3 shows the format of recording on the tape by the data recorder of FIG. 1. FIGS. 4(a) and 4(b) show data to be recorded by the data recorder of FIG. 1.

DETAILED DESCRIPTION OF THE PREFERRED EMBODIMENTS

Figure 1:
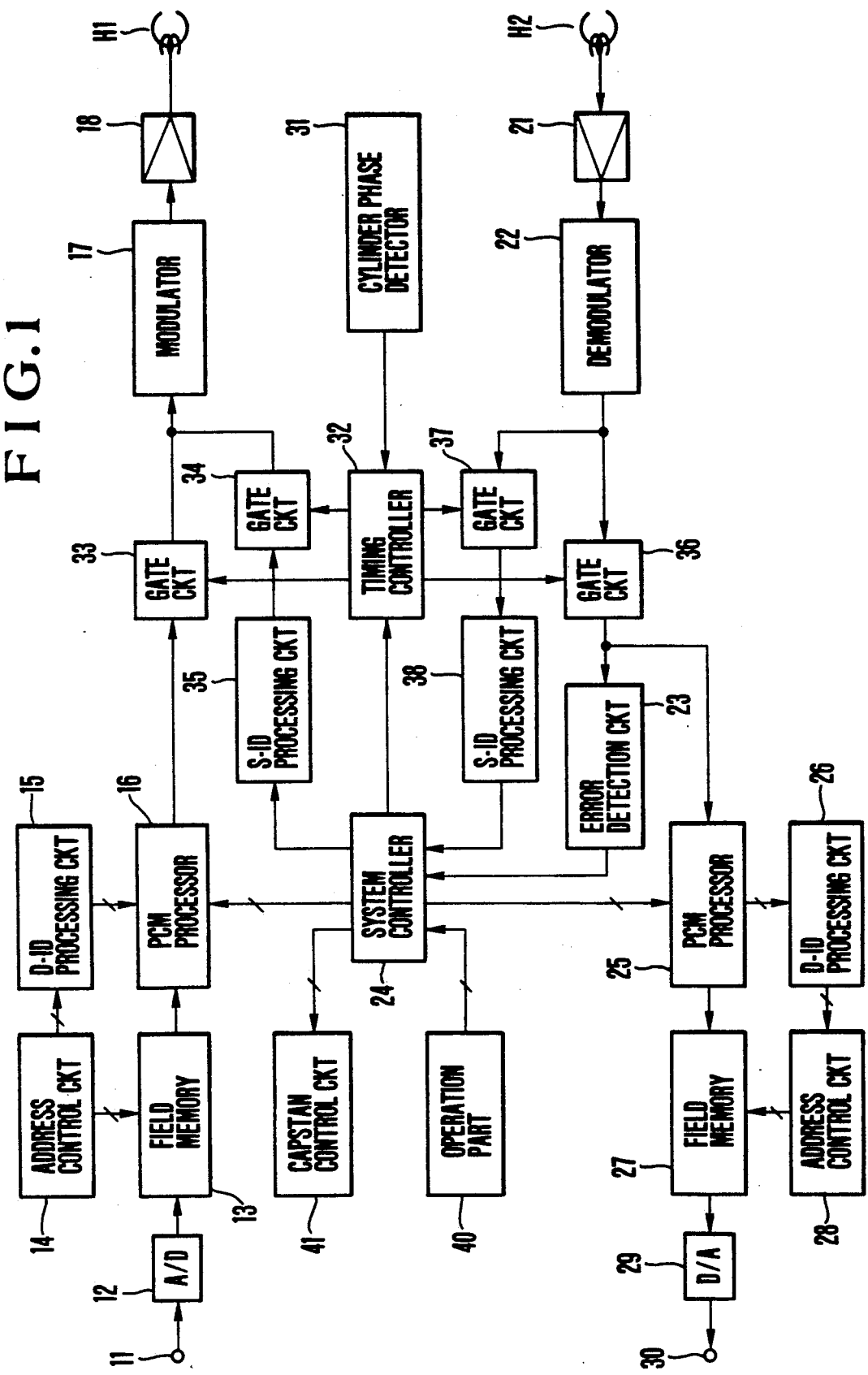
FIG. 1 is a block diagram showing in outline the arrangement of a data recorder which is arranged according to this invention as an embodiment thereof.

The following describes embodiments of this invention with reference to the accompanying drawings:

FIG. 1 shows in outline the arrangement of an embodiment of the invention. Referring to FIG. 1, a terminal 11 is arranged to receive an analog video signal produced by a camera (not shown) or the like. In the case of this embodiment, the data recorder is arranged to record and reproduce the analog video signal by digitizing it. An analog-to-digital (A/D) converter 12 is arranged to digitize the incoming analog video signal. A field memory 13 is arranged to be capable of storing one field portion of the video signal thus digitized. An address control circuit 14 is arranged to control the writing and reading addresses of the field memory 13. A D-ID processing circuit 15 is arranged to form such data as control data or character data other than video data (hereinafter referred to as ID data) and to produce the ID data. In the case of this embodiment, the data recorder is arranged to have two kinds of ID data. One is to be recorded along with the video data. The other is to be recorded in a sub-code area which will be described later. Therefore, hereinafter the former will be called D-ID data and the latter S-ID data.

A PCM processor 16 is arranged to perform an interleaving process and a process of adding error detection and correction codes for the video data and the ID data and then to produce them as PCM data. A modulator 17 is arranged to digital-modulate the PCM data obtained from the PCM processor 16 via a gate circuit 33. A reference numeral 18 denotes a recording amplifier; a numeral 21 denotes a reproduction amplifier; and a numeral 22 a demodulator which corresponds to the modulator 17. An error detection circuit 23 is arranged to detect the number of occurrences of error, an error occurring pattern, etc. by using the error detection code and the error correction code included in the PCM data obtained from the demodulator 22 via a gate circuit 36. A system controller 24 is arranged to control the whole data recorder. A PCM processor 25 is arranged to perform a processing operation in a manner reverse to that of the PCM processor 16. In other words, the PCM processor 25 performs a deinterleaving process and an error correcting process. A D-ID processing circuit 26 is arranged to produce control data of varied kinds and data other than the video data on the basis of ID data obtained from the PCM processor 25. A field memory 27 is arranged to receive video data produced from the PCM processor 25. An address control circuit 28 is arranged to control the writing and reading addresses of &he field memory 27. A digital-to-analog (D/A) converter 29 is arranged to convert the digital video data read out from the field memory 27 into an analog video signal. An output terminal 30 is arranged to output the analog video signal.

Reference symbols H1 and H2 respectively denote rotary heads which are arranged as shown in FIGS. 2(a) and 2(b). As shown in FIG. 2(a), the heads H1 and H2 are mounted on a rotary cylinder 50 at a phase difference of 180 degrees from each other. A magnetic tape T is wrapped around the cylinder 50 at an angle $\theta$ which does not exceed 180 degrees. The head H1 is arranged to be used for recording and the head H2 for reproduction. As shown in FIG. 2(b), the heads H1 and H2 have the same azimuth angle and are arranged to revolve on planes which deviate from each other by as much as a distance X in the direction of axis of revolution. Assuming that recording is to be performed only by the head H1 and the length of each recording track is sufficiently short relative to the pitch of the tracks, this distance X is set at ½ of the track pitch. The head H2 is thus arranged to follow the tracing locus of the head H1.

Referring further to FIG. 1, a cylinder phase detector 31 is arranged to detect the rotation phase of the cylinder 50 and to produce a pulse synchronized with the rotation phase (hereinafter referred to as a PG pulse). A timing controller 32 is arranged to control the gate timing of gate circuits 33, 34, 36 and 37. An S-ID processing circuit 35 is arranged to generate the S-ID data to be recorded in a sub-code area which will be described later. An S-ID processing circuit 38 is arranged to restore information obtained from reproduced S-ID data. An operation part 40 is arranged to be operated by the operator. A capstan control circuit 41 is arranged to control the transporting action on the tape T. The data recorder operates as follows:

FIG. 3 shows a recording format for recording data on the tape T by the data recorder. In the case of this embodiment, the S-ID data is first recorded by the head H1 in sub-code areas a1 and a3 on the tape T as shown in FIG. 3. The S-ID data includes address data indicative of tape addresses. With the S-ID data recorded in the sub-code areas a1 and a3, the address data sets absolute addresses of the tape T arranged in the lengthwise direction of the tape T. Hereinafter this will be called formatting.

In recording the main data on the tape T which has undergone the above stated formatting process, the video data which is the main data is recorded in a main area a2 which is interposed between the sub-code areas a1 and a3 after the recording position of the video data is set in accordance with the address data included in the S-ID data recorded in the sub-code areas a1 and a3. In this instance, the tape T is allowed to travel in the direction of arrow Y for recording the video data. The tape transporting speed for video data recording is set at a speed $\gamma o$. In recording the S-ID data in the sub-code area a3, the tape T is transported in the direction of arrow Y and at a speed which is several to scores of times (n times) as high as the above stated tape transporting speed $\gamma o$. In recording the S-ID data in the sub-code area a1, the tape T is transported in a direction reverse to the direction of arrow Y at a speed which is several to scores of times (m times) as high as the tape transporting speed $\gamma o$.

In reproducing data from the above stated tape T, it goes without saying that any data record is retrieved by utilizing the S-ID data recorded on the tape T.

FIGS. 4(a) and 4(b) show data recorded by the data recorder of this embodiment. Data recorded in the main area a2 is as shown in FIG. 4(a). The data recorded in the sub-code areas a1 and a3 is as shown in FIG. 4(b). Referring to FIG. 4(a), a reference symbol D-IDsync denotes synchronizing bits for the D-ID data; a symbol D-ID denotes the above stated D-ID data; symbol CRCC denotes a redundant code which is a cyclic code provided for detection of errors; a symbol DATAsync denotes synchronizing bits for for the main data. A symbol DATA denotes the main data. The train of data shown in FIG. 4(a) forms one data block. Several hundreds of data blocks are recorded in each track on the main area a2. The amount of each data block is arranged to include several bytes of D-ID data and scores of bytes of the main data DATA. The scores of bytes of the main data DATA include parity words which are redundant codes for error correction. The parity words are formed on the basis of a data matrix for adding an error correction code (ECC) which is obtained by shuffling an amount of data corresponding to several data blocks. The parity words are scattered within the main data DATA of FIG. 4(a).

Figure 5:
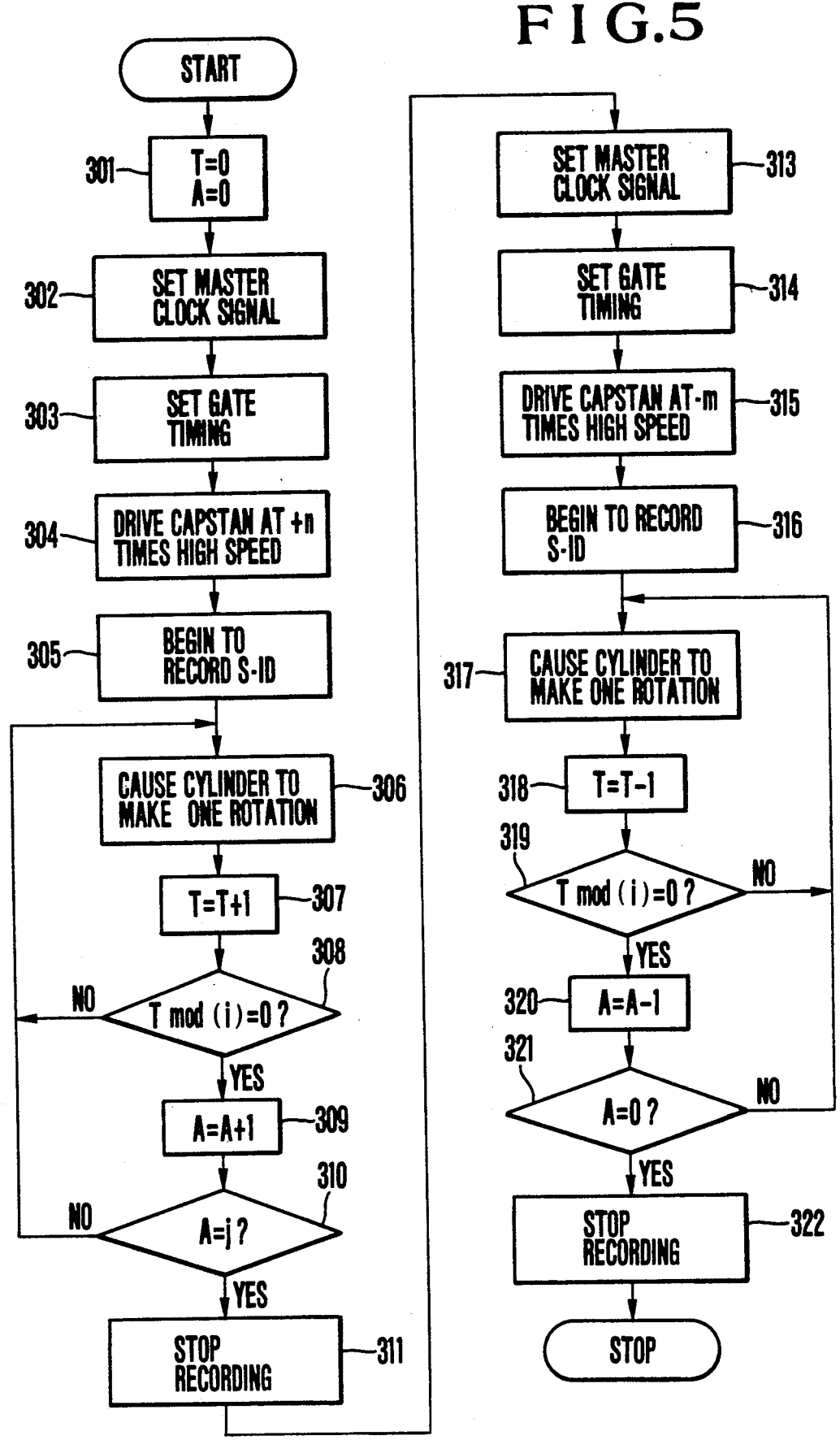
FIG. 5 is a flow chart showing a recording operation in sub-code areas by the data recorder of the embodiment.

The synchronizing bits S-IDsync shown in FIG. 4(b) form one data group in conjunction with the S-ID data and the code CRCC. The data group is recorded in each track on the sub-code areas a1 and a3 in a state of being repeated several hundred of times. The details of operation of the data recorder are as described below:

FIG. 5 is a flow chart showing the operation of the system controller 24 to be performed in recording the S-ID data in the sub-code areas a1 and a3. Referring to this flow chart of FIG. 5, the S-ID data is recorded as follows: When an instruction for recording the S-ID data in the sub-code areas a1 and a3 (a formatting instruction) is given from the operation part 40, the recorder begins to execute a formatting action. At a step 301: The system controller 24 sets variables T and A at 0 respectively. At a step 302: The frequency of a master clock signal which controls the actions of the S-ID processing circuit 35, the modulator 17, etc. is set. The frequency of the master clock signal is arranged to be set for each of varied modes in such a manner that a reproduced clock frequency remains unchanged by any change in the relative speed of the tape T and the heads H1 and H2 that might result from a difference in the tape transporting speed between the tape speed used for tape address retrieval and the tape speed for recording the S-ID data while the main data is recorded or reproduced. In the case of this embodiment, the rotation speed of the cylinder 50 is arranged to be unvarying in any of the varied modes. The master clock signal is set at a frequency in such a way as to have the rotation speed coincide with the wave length of the master clock signal recorded on the tape T when the main data is recorded.

The following shows an example of the frequency of the master clock signal: Assuming that the inclination of the recording tracks relative to the lengthwise direction of the tape T is 4.90° with the tape T transported at the normal speed γo and the relative speed Vo of the head and the tape T is 380.00 cm/min when the tape T is brought to a stop, the frequency f of the master clock signal changes in relation to the tape speed γ as shown in Table 1. In Table 1 below, a reference symbol V denotes the relative speed of the tape T and the heads H1 and H2; and a symbol φ the inclination of the tracing direction of the heads H1 and H2 relative to the lengthwise direction of the tape T.

TABLE 1

| The frequency of master clock signal in relation to tape speed | | | |
|---|---|---|---|
| ν | V (cm/m) | φ (degree) | f (MHz) |
| +100 νo | 237.39 | 7.84 | 7.27 |

TABLE 1-continued

| The frequency of master clock signal in relation to tape speed | | | |
|---|---|---|---|
| ν | V (cm/m) | φ (degree) | f (MHz) |
| +60 νo | 294.33 | 6.31 | 9.02 |
| +30 νo | 337.14 | 5.51 | 10.33 |
| +10 νo | 367.71 | 5.08 | 11.27 |
| νo | 378.57 | 4.90 | 11.60 |
| −10 νo | 394.29 | 4.71 | 12.08 |
| −30 νo | 422.89 | 4.39 | 12.96 |
| −60 νo | 465.82 | 3.98 | 14.27 |
| −100 νo | 523.07 | 3.55 | 16.03 |

Again referring to FIG. 5, the S-ID data is to be first recorded in the sub-code area a3. At a step 303: The timing controller 32 is, therefore, caused to set the gate timing of the gate circuit 34 at the timing when the head H1 traces the area a3. Meanwhile, other gate circuits 33, 36 and 37 are inhibited from performing gating actions. At a step 304: The capstan control circuit 41 is caused to have the tape T moved in the direction of arrow Y at a speed nγo. At a step 305: The S-ID processing circuit 35 is caused to begin to generate data in accordance with the format shown in FIG. 4(b). The S-ID data begins to be recorded.

Then, the above stated variable T is recorded as data indicative of a track number of each track in the sub-code area and the other variable A as address data indicative of a tape address. For example, with the tape address assumed to be renewed for every amount of record obtained per sec at a normal recording rate, the rotation frequency of the cylinder 50 to be 3600 rpm and n = 10, the number i of recording tracks formed in the sub-code area a3 becomes 6 (=3600 / (10×60)) while one address portion of the tape T is transported. Therefore, the variable T is incremented by one (at a step 307) every time the cylinder 50 makes one rotation (at a step 306). When the variable T becomes a multiple of i, that is, when T mod (i) becomes 0, at a step 308, the flow of operation comes to a step 309. At the step 309: The variable A is incremented by one. At a step 310: A check is made to see if the variable A has reached a constant j, which is set according to a recordable period of time on the tape T. For example, if the tape T is of such a length that the tape T will be transported from its starting point to its ending point in 30 minutes with the tape T allowed to travel at the speed γo, the constant j is set at 1800 or less than that value. In that instance, the constant j is generally set at 1500 or thereabout to make some allowance.

The variables A and T are thus up-counted at the steps 306 to 310. When the variable A reaches the constant j at the step 310, the flow comes to a step 311. At the step 311: The capstan control circuit 41 is caused to stop the tape transporting action to stop recording the S-ID data in the sub-code area a3. Following that, the S-ID data is recorded in the other sub-code area a1 in the following manner: At a step 313: The frequency of the master clock signal is set according to Table 1 in the same manner as at the step 302. At a step 314: The gate timing of the gate circuit 34 is set at the timing when the head H1 traces the area a1. At a step 315: The capstan control circuit 41 is caused to have the tape T moved in the direction reverse to the direction of arrow Y at a speed mγo. At a step 316: The S-ID data begins to be recorded in the same manner as at the step 305.

At a step 317: The cylinder 50 makes one rotation. At a step 318: The variable T is down-counted every time the cylinder 50 makes one rotation. At a step 319: A check is made for T mod (i) =0. At a step 320: The variable A is down-counted every time there obtains the state of T mod (i) =0 At a step 321: A check is made to see if the variable A has reached 0. The S-ID data is thus recorded in the sub-code area a1 until the variable A becomes 0. At a step 322: The tape T is stopped from moving to stop recording the S-ID data.

Figure 6:
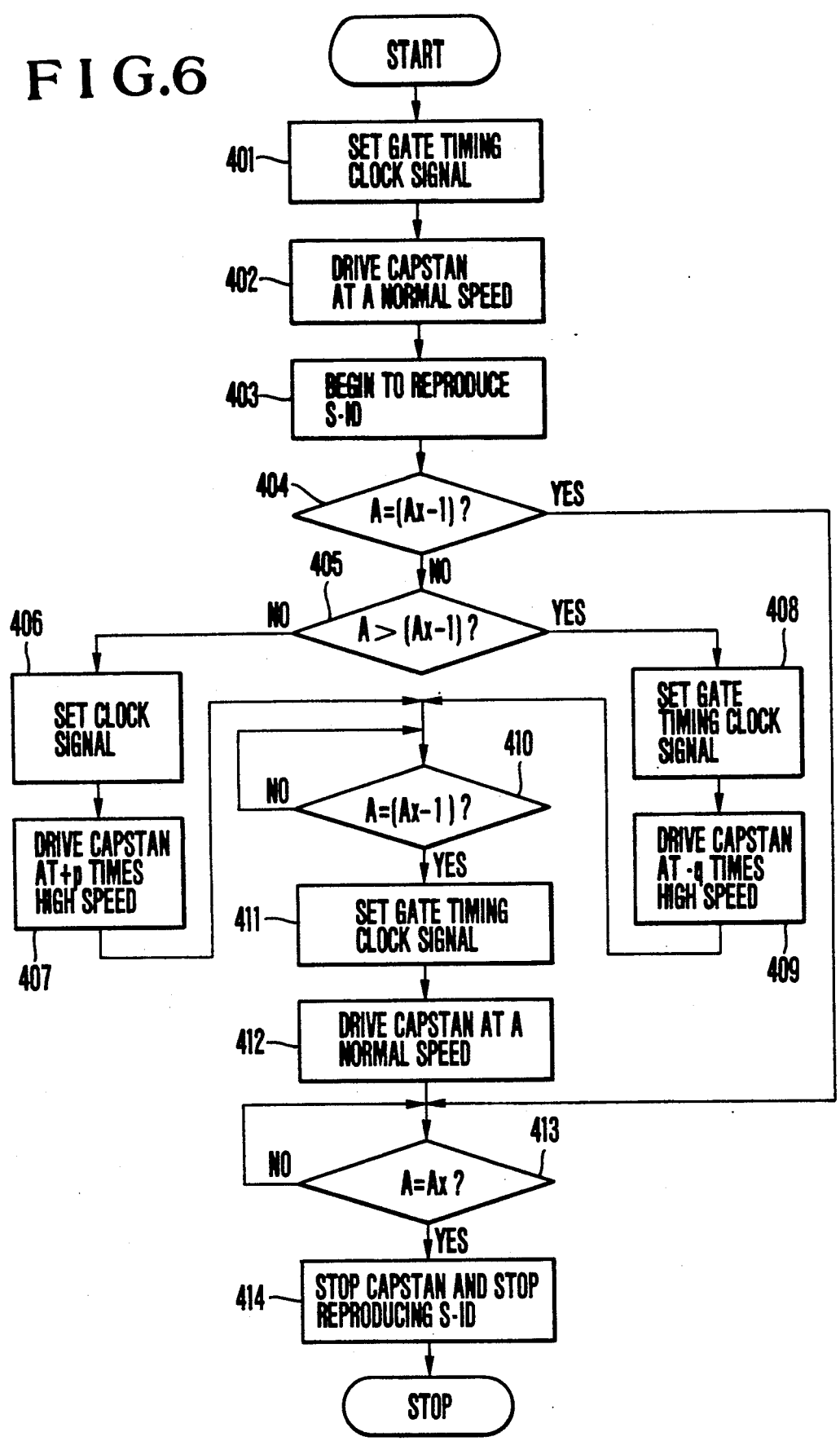
FIG. 6 is a flow chart showing the address retrieval operation of the data recorder of FIG. 1.

FIG. 6 is a flow chart showing a retrieval operation of the system controller 24 of FIG. 1. In this case, the tape T is moved to a desired point thereof by using the S-ID data, i.e. address data A, which is recorded in the sub-code area a1 or a3. Referring to the flow chart, the retrieval operation is as follows:

Step 401: Upon receipt of an instruction for retrieval from the operation part 40, the system controller 24 causes the timing controller 32 to have the gate timing of the gate circuit 37 set at the timing when the head H2 traces the area a3. Then, the frequency of the master clock signal for the demodulator 22 and the S-ID processing circuit 38 is determined in accordance with Table 1. Step 402: The capstan is caused to move the tape T at the speed $\gamma o$ in the direction of arrow Y as shown in FIG. 3. Step 403: The S-ID data begins to be reproduced by the S-ID processing circuit 38.

At a step 404: Assuming that the desired tape address set by means of the operation part 40 is Ax, the address data A is checked to see if it is at a value (Ax −1). If not, the flow comes to a step 405. At the step 405: The address data A is again checked to see if it is larger than the value (Ax −1). If so, the flow comes to a step 408. At the step 408: The timing controller 32 is caused to set the gate timing of the gate circuit 37 at the timing when the head H2 traces the area a1. The frequency of the master clock signal is set according to the tape transporting speed to be used for the retrieval operation (see Table 1). At a step 409: The capstan is operated to move the tape T at a high speed $q\gamma o$ in the direction reverse to the direction of arrow Y (negative direction). Meanwhile, if the variable or address data A is found to be smaller than the value (Ax −1) at the step 405, the flow comes to a step 406. At the step 406: The frequency of the master clock signal is set as shown in Table 1 without changing the gate timing of the gate circuit 37. At a step 407: The capstan is caused to transport the tape T in the direction of arrow Y of FIG. 3 (positive direction) at a high speed $p\gamma o$.

While the tape T is caused to travel at a sufficiently high speed at the step 407 or 409, the head H2 can be allowed to transversely trace the tracks on the area a3 or a1. This high tape speed $p\gamma o$ or $q\gamma o$ will be described in detail later. With the head H2 thus allowed to transversely trace the tracks on the area a3 or a1, the data group which is as shown in FIG. 4(b) and is repeatedly recorded several hundreds of times the address data A can be picked up at least once through the S-ID processing circuit 38. However, if the tracing locus angle of reproduction differs too much from that of recording, it would be impossible to reproduce any of the data groups of the S-ID data. To solve this problem, the data recorder in the case of this embodiment is arranged to reproduce the S-ID data from the tracks formed in the area a3 when the tape T is traveling at a high speed in the positive direction as stated above and from the tracks formed in the other area a1 when the tape T is traveling at a high speed in the negative direction. This arrangement enables the head to trace the tracks at an angle which does not vary too much in recording and in reproduction, so that the data group can be picked up for adequate reproduction of the S-ID data.

At a step 410: The address data A is checked for a value of (Ax −1). If the data A is found to be in that value, the flow comes to a step 411. At the step 411: The gate timing of the gate circuit 37 is set at the timing when the head H2 traces the area a3. The frequency of the master clock signal is set at a value for transporting the tape T at the speed $\gamma o$. At a step 412: The tape T is transported at the speed $\gamma o$ in the positive direction.

At a step 413: With the S-ID data continuously picked up, the reproduced address data A is checked for a desired address Ax. When the data comes to coincide with the address Ax, the flow comes to a step 414. At the step 414: The S-ID data is stopped from being reproduced and the operation comes to an end.

The tape T then comes to a stop in a position to enable the head H2 to trace a track which is of the smallest track number T among the tracks which are located at the tape address Ax. After this, the main data can be either recorded or reproduced starting with the leader part of the desired tape address. Further, in case that the data recorder is provided with a rotary erasing head, the main data at a desired tape address can be erased by applying an erasing current only at a timing at which the rotary erasing head traces the area a2.

Figure 7:
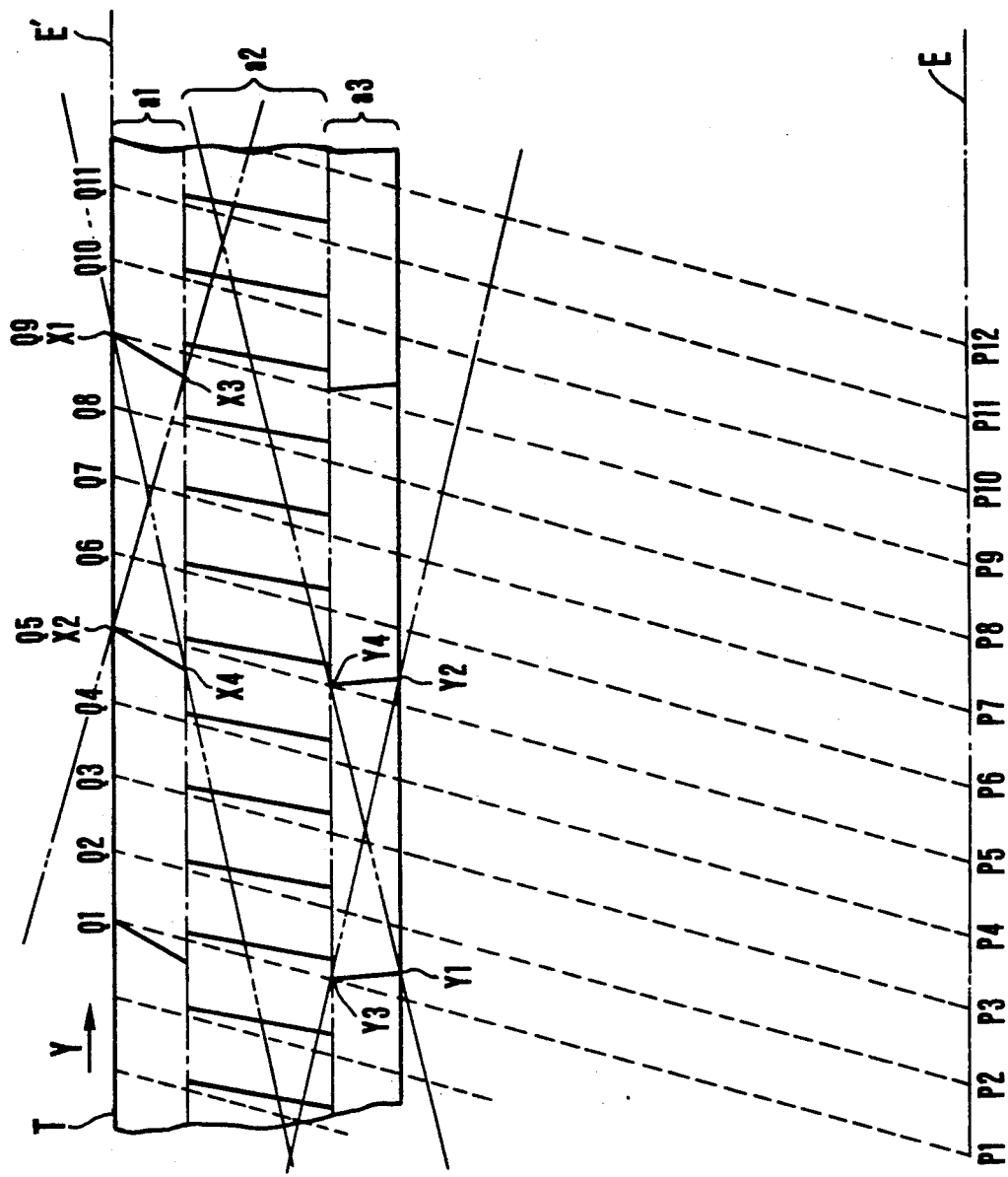
FIG. 7 shows a tape transporting speed for the address retrieval operation.

FIG. 7 shows the tape transporting speed to be employed in performing a high speed retrieval operation. In FIG. 7, a reference symbol T denotes a magnetic tape. Broken line segments P1 - Q1, P2 - Q2, - - - and P11 - Q11 are in parallel to the tracing direction of the rotary head when the tape T is in repose. The spacing distance between these line segments in the lengthwise direction of the tape T is arranged to correspond to the length of a tape portion to be moved during a rotation period, or track forming period, of the rotary head H1 when the tape T is allowed to travel at the speed $\gamma o$. The length of each of these line segments corresponds to a distance to which the rotary head moves while the tape T is in pause. Therefore, points P1, P2, - - - and P11 on a virtual line E coincide with points Q1, Q2, - - - and Q11 on another virtual line E'. The rotary head traces the tape T upward from below as viewed on the figure. When the tape T is traveling in the positive direction at a speed $k\gamma o$, the center of the tracing locus of the head is on a line segment connecting points PK and P (K-k) and the interval distance between the centers of tracing loci is k times as much as the distance between the broken lines. Full lines in the area a2 indicate the center of the tracing locus obtained during normal recording or reproduction. Full lines in the area a1 indicate the center of the tracing locus obtained when the S-ID data is recorded by transporting the tape T in the negative direction at a speed $4\gamma o$. Full lines in the area a3 indicate the center of the tracing locus obtained when the S-ID data is recorded by transporting the tape T in the positive direction at the speed $4\gamma o$.

The S-ID data is extractable without fail during high speed retrieval if the the center line of one of the tracks in the area a1 comes to cross the center of the tracing locus of the rotary head. This likewise applies to the tracks in the area a3. In other words, in order to pick up the S-ID data from the tracks on the area a1 without fail, the tape T is transported either in the positive direction at a speed higher than a tape transporting speed at which the center of the tracing locus of the rotary head becomes a line segment X2-X3, or in the negative direction at a speed higher than a tape transporting speed at which the center of the tracing locus of the rotary head becomes a line segment X1–X4. Further, in extracting the S-ID data from the tracks on the area a3 without fail, the tape T is transported either in the positive direction at a speed higher than a tape transporting speed at which the center of the tracing locus of the rotary head becomes a line segment Y2–Y3, or in the negative direction at a speed higher than a tape transporting speed at which the center of the tracing locus of the head becomes a line segment Y1–Y4.

Assuming that the rotary head is allowed to transverse the area a1 or a3 while it turns around 30 degrees with the tape transported in the negative direction at the speed $4\gamma o$ for recording in the area a1 or in the positive direction at the speed $4\gamma o$ for recording in the area a3, the tape T must be transported at a speed at least $44 (=4\times 360 / 30-4)\gamma o$ in the positive direction or at a speed at least $52 (=4\times 360 / 30+4)\gamma o$ in the negative direction in order to extract the S-ID data from the area a1. In extracting the S-ID data from the area a3, the tape T must be transported at a speed at least $52\gamma o$ in the positive direction or at least $48\gamma o$ in the negative direction. However, in the case of this embodiment, the data recorder is arranged to have the tape T transported in the negative direction in reproducing the S-ID data from the area a1 and in the positive direction in reproducing it from the area a3. Therefore, the tape T must be transported at a speed at least $52\gamma o$ in both cases.

The generic description of this is as follows: Assuming that a length of time required for forming one track in recording the S-ID data is $\tau 1$, the track forming period is $\tau 2$ and the tape transporting speed for recording the S-ID data is $\gamma x$, the tape transporting speed $\gamma y$ for a retrieval operation must be at least $(\tau 2 / \tau 1 + 1)\gamma x$ if the tape is to be transported in the same direction as in the case of recording or must be at least $(\tau 2 / \tau 1 - 1)\gamma x$ if the tape is to be transported in the direction reverse to the recording direction. Generally, however, a record is reproducible with more than half of the width of the head on the record track. Therefore, with the head width assumed to be Hw and the track pitch of the areas a1 and a3 assumed to be Tp, the tape transporting speed for retrieval may be arranged to be at least $(\tau 2 / \tau 1 + 1)$ $(Tp - Hw)\gamma x / Tp$ in the same direction as the recording direction or at least $(\tau 2 / \tau 1 - 1) (Tp - Hw)\gamma x / Tp$ in the reverse direction.

In the case of the embodiment described, with the head width Hw assumed to be ¾ of the track pitch of the area a2, the tape transporting speed for a retrieval operation should be $\gamma y > (360 / 30+1) (4-3 / 4) 4\gamma o / 4 = 169\gamma o / 4 \approx 42.25\gamma o$. Therefore, the S-ID data is reproducible for high speed retrieval by transporting the tape at a speed which is about 45 times as high as a normal recording speed.

Figure 8:
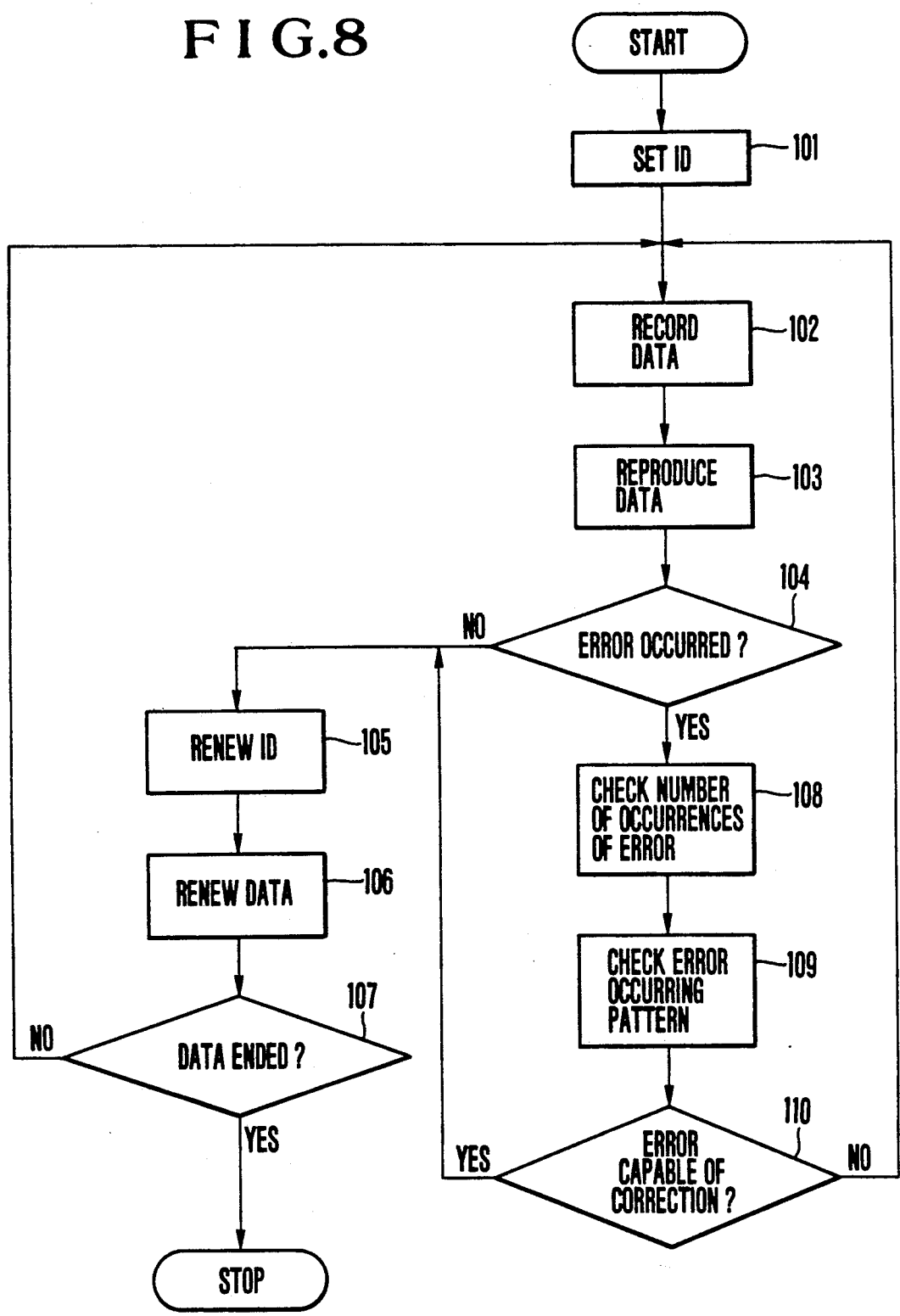
FIG. 8 is a flow chart showing the main-data recording operation of the data recorder of FIG. 1.

The operation of the embodiment for recording the main data is as follows: FIG. 8 is a flow chart showing the operation of the system controller 24 to be performed in recording the main data. One field portion of digital video data produced from the A/D converter 12 in response to the operation of an operation member which is not shown is written into the field memory 13. The bit rate of the digital data which is digitized in real time is extremely high. Therefore, the field memory 13 produces one field portion of the video data, i.e. still image data, by reducing the bit rate thereof. As a result, the one field portion of the video data is recorded in many tracks on the area a2. At a step 101 of FIG. 8, the D-ID processing circuit 15 is caused to set the D-ID data. The D-ID data includes among others track number data indicating the position of each data record bearing track among the tracks having one field position of the video data recorded therein. At a step 102: When the recording head H1 reaches a given rotation phase to enter the area a2, the gate circuit 34 begins to perform a gate action on the recording signal. The head H1 records one track amount of data. This recording process comes to an end when the cylinder 50 turns around $\theta 2$ degrees. At a step 103: When the cylinder 50 further turns around to a degree $(180-\theta 2)$, the gate circuit 36 begins to perform a gate action on a demodulated signal. Then, the reproducing head H2 has reached the start point of the track in which the data has been just recorded within the main area a2. The head H2 reproduces the recorded signal of this track.

At a step 104: The reproduced signal obtained from the reproducing head H2 is supplied via the reproduction amplifier 21 to the demodulator 22. The error detection circuit 23 then detects the number of occurrences of data error and the error occurring pattern by using an error correction code supplied via the gate circuit 36 from the demodulator 22. If no error is found to have occurred, the flow of operation comes to a step 105. At the step 105: A part of the ID data such as the track number data is renewed. At a step 106: The field memory 13 supplies the PCM processor 16 with data next be recorded. Meanwhile, during this recording process, the S-ID data is reproduced from the area a1 in accordance with the same master clock signal. At a step 107: When address data which is thus reproduced comes to change, it is considered that a predetermined amount of data has been recorded and the operation according to this flow chart then comes to an end. If the address data is found unchanged, new data is recorded in a next track.

If any data error is considered to have occurred at the step 104, the flow comes to a step 108. At the step 108: A check is made for the number of occurrences of data error. At a step 109: A check is made for the occurring pattern of data errors. At a step 110: A check is made on the basis of results of checks made at the steps 108 and 109 to see if the data error is capable of correction. If so, the flow comes back to the step 102 through the steps 105 and 106 to record new data in a next track. If the error is determined to be not capable of correction at the step 110, the flow comes directly back to the step 102 without renewing the ID data and the main data. Then, at the step 102, the same data is again recorded in the next track.

In the operation according to the flow chart of FIG. 8, the length of time required for the processes to be executed after the end of reproduction at the step 103 and before the start of reproduction at the step 102 is of course arranged to be within a period of time required for the rotation of the cylinder 50 to the degree $(180-\theta 2)$.

In case that the error in the recorded data is found to be not capable of correction by the above stated verifying action, the same data is again recorded as mentioned above. This arrangement of the embodiment enables the data recorder to perform highly reliable data recording without stopping the rotation of the cylinder 50 and the travel of the tape T. Therefore, data recording can be continuously and reliably accomplished within a short period of time.

Figure 9:
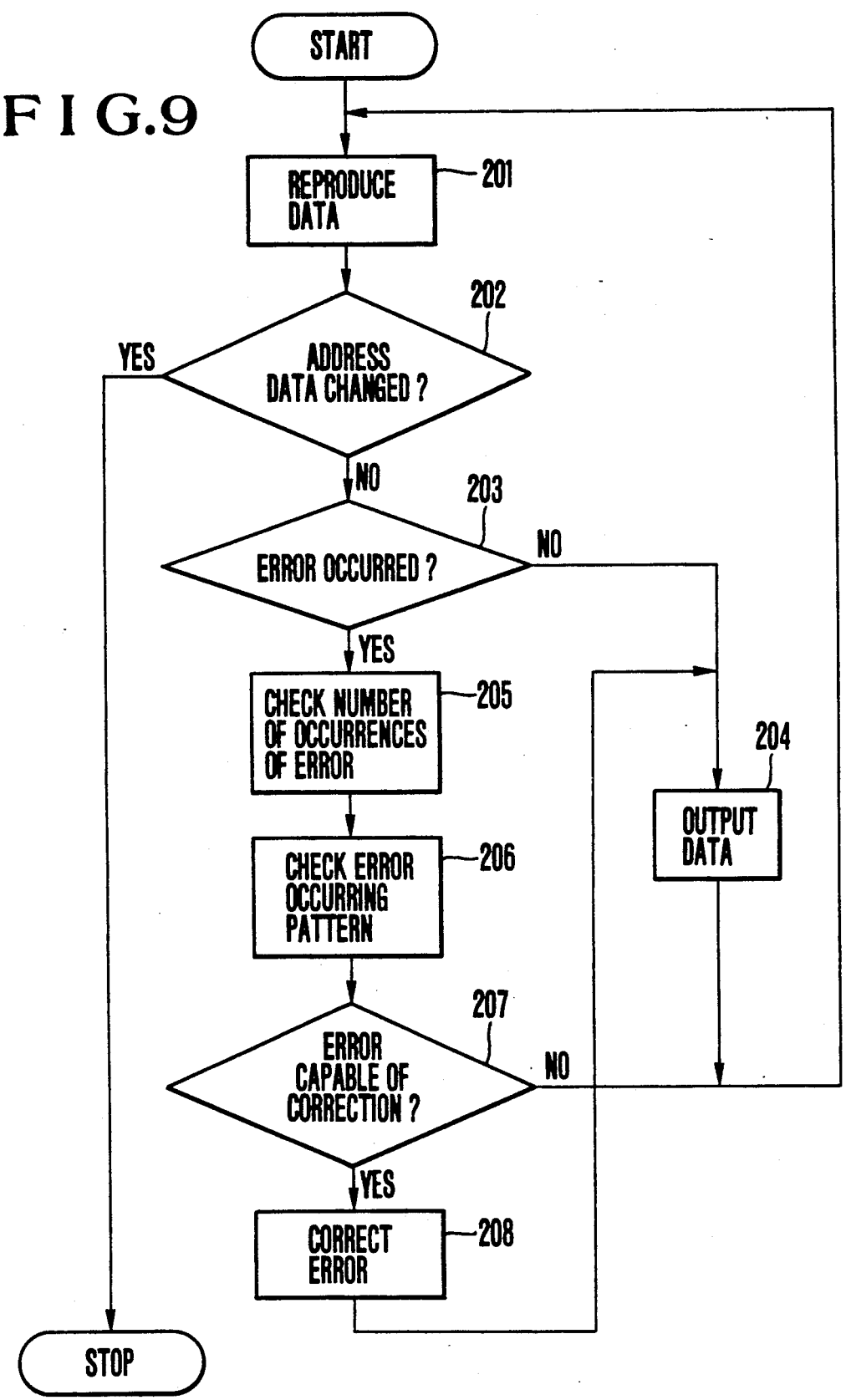
FIG. 9 is a flow chart showing the main-data reproducing operation of the data recorder of FIG. 1.

FIG. 9 is a flow chart showing the operation of the system controller 24 to be performed in reproducing the record of main data. Referring to FIG. 9, the main data record is reproduced in the following manner: At a step 201: The main data and the S-ID data begin to be reproduced by the reproducing head H2 in accordance with one and the same master clock signal. At a step 202: A check is made to see if there has occurred any change in the address data included in the reproduced S-ID data. If the address data is judged to be unchanged the flow comes to a step 203. At the step 203: The output of the error detection circuit 23 is checked for occurrence of any data error. If no error has occurred, the flow comes to a step 204. At the step 204: The PCM processor 25 is caused to perform a de-interleaving action on the data before the data is produced. The data from the PCM processor 25 is written into the field memory 27 in accordance with the address determined on the basis of the reproduced ID data. In the event of occurrence of any error, the flow comes to a step 205. At the step 205: A check is made on the basis of the result of detection made by the error detection circuit 23 for the number of occurrences of error. At a step 206: A check is made for an error occurring pattern. At a step 207: A check is made to see if the error is capable of correction. If the error is found to be capable of correction, the flow comes to a step 208. At the step 208: The error is corrected. The flow then comes back to the step 204 to have the data de-interleaved and produced. Meanwhile, if the error is found to be not capable of correction, data which is the same as the reproduced data is considered to be recorded in a next track and the flow comes back to the step 201 without producing the data. At the step 201, the record in the next track is reproduced. Further, a period of time during which the flow comes back to the step 201 after execution of the step 201 is of course arranged to be a period during which the cylinder 50 turns around (360 θ) degrees.

In the case of the embodiment described, the data recorder is arranged to have the address data A which indicates the tape address for each track recorded several hundreds of times in the sub-code areas a1 and a3 on both sides of the video data recording area a2. The address data A, therefore, can be reproduced without difficulty even in cases where the tape is transported at a high speed as well as in the case of a normal tape transporting speed. The arrangement enables the main data to be promptly recorded at any desired tape address. In reproducing the record of the main data, the address data can be reproduced according to the master clock signal provided for the main data. Further, for recording the address data in the areas a1 and a3, the tape transporting speed is arranged to be faster than the tape speed for recording the main data. Therefore, the "formatting" action on the tape can be accomplished in a short period of time.

Further, in recording the S-ID data in the areas a1 and a3, the tape transporting direction for recording in the area a1 is arranged to be reversed for recording in the other area a3. This arrangement permits a further increase in a maximum tape speed usable for extraction of a data block irrespectively of the tape transporting direction. The "formatting" action on the tape can be completed by allowing the tape to make just one reciprocating travel, so that the period of time required for a tape "formatting" operation can be shortened. Further, for address retrieval, the tape is arranged to be transported at such a speed that enables the S-ID data to be reproduced without fail while the rotary head makes one rotation. That arrangement permits the extracting action on the address data to be most finely accomplished.

Further, the frequency of the master clock signal is readjusted to every one of different tape transporting speeds. This ensures that a data record obtained at any tape transporting speed can be adequately reproduced at any desired tape transporting speed.

Figure 10:
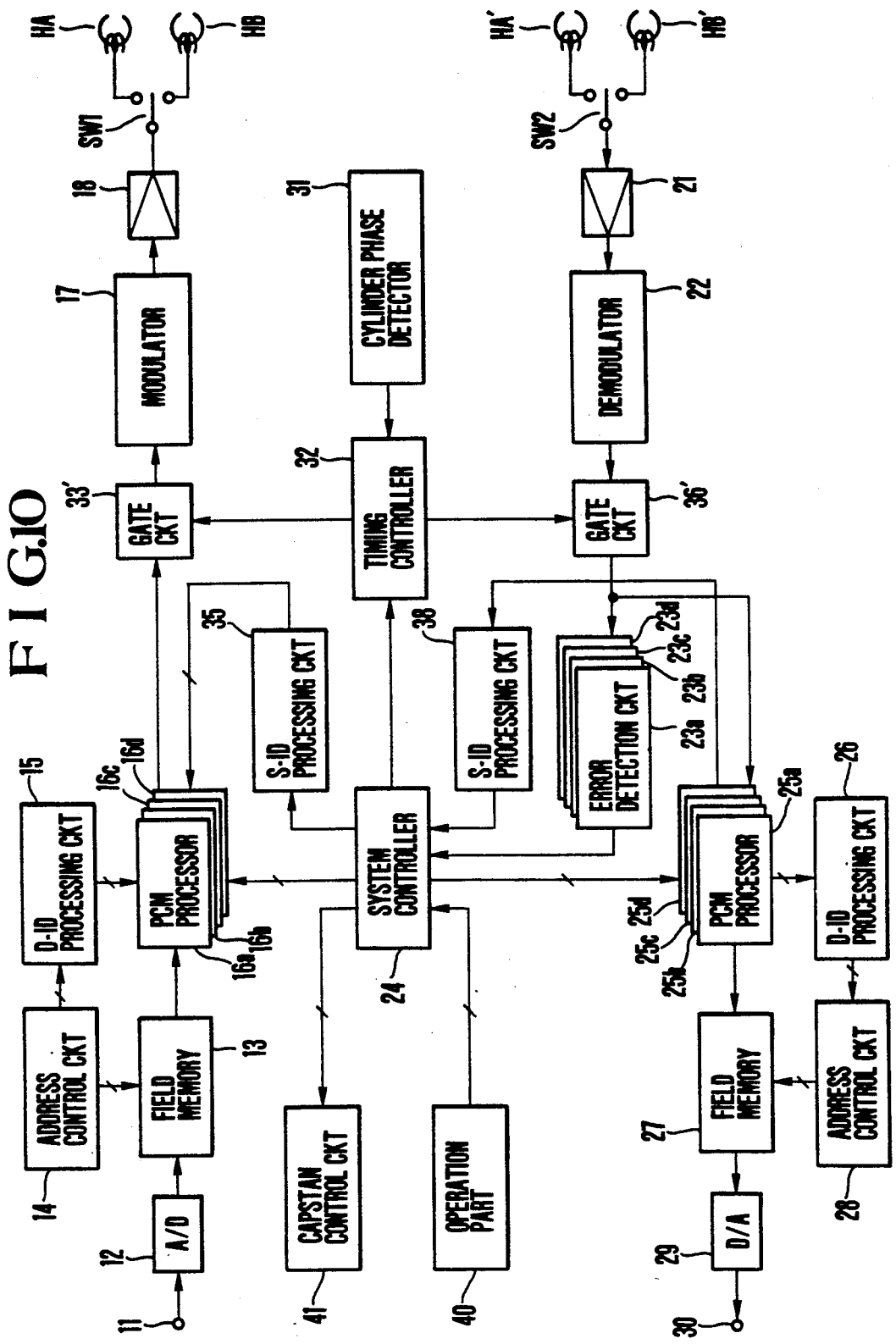
FIG. 10 is a block diagram showing in outline the arrangement of a data recorder which is arranged as another embodiment of this invention.
Figure 12:
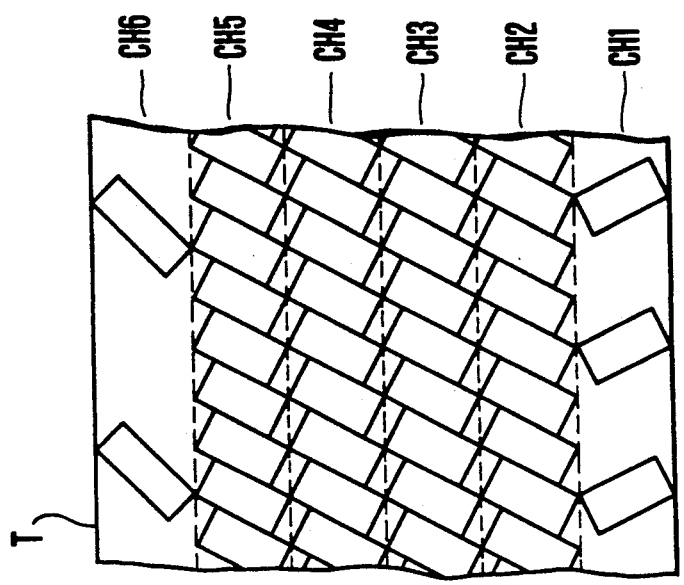
FIG. 12 shows the format of recording on the tape by the data recorder of FIG. 10.
Figure 11A:
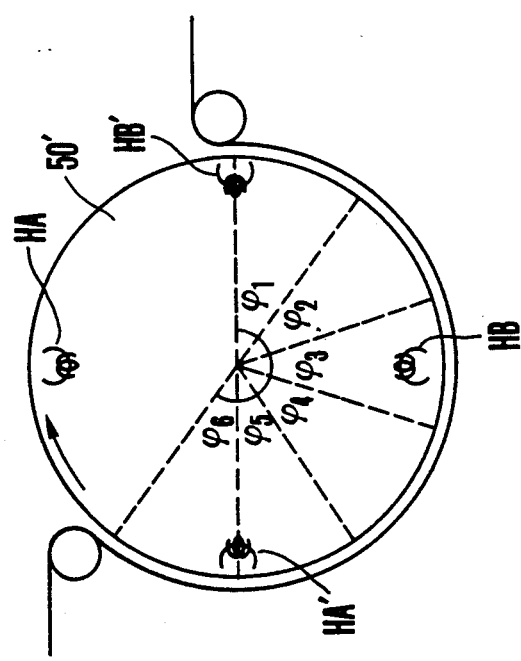
FIGS. 11(a) and 11(b) show the arrangement and location of heads of the data recorder of FIG. 10.
Figure 11B:
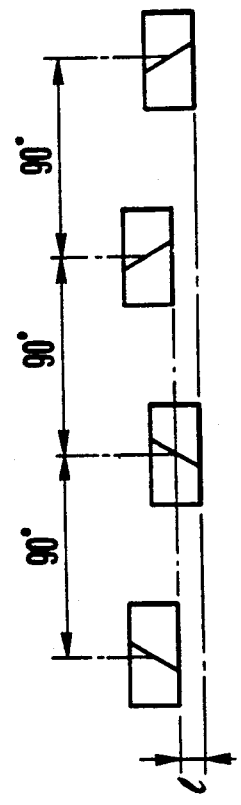

FIG. 10 shows in outline the arrangement of a data recorder which is arranged as another embodiment of the invention. FIGS. 11(a) and 11(b) show the arrangement and the location of the heads of the data recorder. FIG. 12 shows the recording loci of the data recorder obtained on the tape. In FIG. 10, the same component parts as those of FIG. 1 are indicated by the same reference numerals and the details of them are omitted from the following description: As shown in FIG. 12, in the case of this embodiment, the width of the tape T is divided to obtain six areas. Two areas CH1 and CH6 which are located on two edge side of the tape are arranged to be used for recording the S-ID data. Remaining four areas are arranged to be used for recording the main data.

The data recorder has four rotary heads. They include recording heads HA and HB which have different azimuth angles and are arranged to revolve at a phase difference of 180 degrees. This head arrangement enables the recorder to do so-called azimuth overlapped writing in each of the main data recording areas. Reproducing heads HA' and HB' differ and delay 90 degrees in revolving phase from the recording heads HA and HB and are arranged to revolve on a rotation plane. The rotation plane of these heads HA' and HB' differs from that of the heads HA and HB by a distance l which is as shown in FIG. 11(b) and corresponds to one half of the pitch of tracks obtained by the azimuth overlapped writing. This enables the reproducing heads HA' and HB' to follow and trace the tracks formed by the recording heads HA and HB respectively.

The S-ID data is arranged to be recorded in the area CH1 with the tape transported in the positive direction at a speed several times as high as a tape speed for recording the main data and to be recorded in the area CH6 with the tape transported in the negative direction also at the speed several times as high as the main data recording speed. PCM processors 16a, 16b, 16c and 16d are arranged to separately and simultaneously process data to be recorded in the areas CH2, CH3, CH4 and CH5 during main data recording. Compared with use of a single processor, the arrangement enables the data to be processed for a longer period of time. Error detection circuits 23a, 23b, 23c and 23d are arranged to separately and simultaneously process the main data reproduced by the heads HA' and HB' from the areas CH2, CH3, CH4 and CH5. By virtue of this arrangement, the area in which any error has occurred can be determined during a verifying operation. This arrangement enables the recorder to record the same data only in the area in which the error has occurred, so that recording time can be shortened. PCM processors 25a, 25b, 25c and 25d are likewise arranged to separately and simultaneously process the data reproduced from the areas CH2, CH3, CH4 and CH5.

With a signal processing system arranged in the above stated manner, the data recorder is capable of recording data either simultaneously in the areas CH2, CH3, CH4 and CH5 or only in one or more areas. In the case of reproduction, recorded data can be selectively reproduced from any of the areas as desired.

In recording the S-ID data, only one of the PCM processors 16a, 16b, 16c and 16d is used for a signal processing operation. In reproducing the recorded S-ID data, a signal processing operation is carried out also using only one of the PCM processors 25a, 25b, 25c and 25d.

A gate circuit 33' is arranged to perform a signal gating action in recording the S-ID data at a timing at which the head HA or HB traces the area CH1 or CH6. In recording the main data, the gate circuit 33' performs the signal gating action at a timing at which the head HA or HB traces one of or more than one of the areas CH2 to CH5. A gate circuit 36' is arranged to perform a signal gating action at a timing at which the head HA' or HB' traces the area CH1 or CH6 when the recorded S-ID is reproduced, that is, at the time of a retrieval operation. In reproducing the main data or in performing a verifying operation, the gate circuit 36' performs a signal gating action at a timing at which the head HA' or HB' traces one of or more than one of the areas CH2 to CH5.

In performing high speed retrieval, the tape transporting speed of the embodiment is determined on the following concept: Each of the areas CH1 and CH6 are traced while the rotary head turns around 36 degrees. One track is formed every time the rotary head turns around 180 degrees. However, the recorded data cannot be reproduced if the azimuth angle differs. Therefore, reference must be made to the track forming period obtained with the same azimuth angle. The value of $\tau 2 / \tau 1$ thus becomes 10. Assuming that the tape transporting speed for recording the S-ID data is four times as high as the tape speed for recording the main data, the tape must be transported at a speed at least 44 times, i.e. $(=(10+1)\times 4)$ times as high as the recording speed in carrying out a high speed retrieval in the same direction. Further, in case that the head width is 1.5 times as large as the main data track pitch and that reproduction is possible with the applicable track transported by the head to an extent at least by one half of the head width, the tape transporting speed required for the high speed retrieval is at least 7.5 $(=(10+1) (4-1.5) 4/4)\gamma o$ with the tape transported in the same direction as the tape transporting direction used in recording.

The data recorder of this embodiment of course gives the same advantageous effect as the preceding embodiment described in the foregoing.

What is claimed is:

1. A data recording apparatus comprising:
a) a cylinder member provided with a rotary head;
b) transport means for transporting a tape-shaped recording medium in the lengthwise direction thereof, said tape-shaped recording medium being wrapped round said cylinder member;
c) means for generating main data related to main information;
d) means for generating sub-code data related to sub-information which is other than said main information; and
e) mode changeover means for changing over said apparatus between a plurality of modes thereof, said plurality of modes including:
a first recording mode in which said main data is recorded in many parallel tracks formed by said rotary head at a first area extending in the lengthwise direction of said tape-shaped recording medium; and
a second recording mode in which said sub-code data is repeatedly recorded a plurality of times in each of many parallel tracks formed by said rotary head at a second area extending in the lengthwise direction of said tape-shaped recording medium and in parallel to said first area.

2. An apparatus according to claim 1, wherein said sub-code data includes address data indicative of positions in the lengthwise direction of said tape-shaped recording medium.

3. An apparatus according to claim 1, wherein said sub-code data includes track number data indicative of track numbers of tracks formed on said second area.

4. An apparatus according to claim 3, wherein said track number data includes data indicative of the track number between tracks corresponding in common to the address data.

5. An apparatus according to claim 1, wherein said transport means is arranged to transport said tape-shaped recording medium at a first speed in said first recording mode and at a second speed in said second recording mode, said second speed being faster than said first speed.

6. An apparatus according to claim 5, wherein said plurality of modes further includes a third recording mode in which: said transport means transports said tape-shaped recording medium in a direction reverse to a transporting direction of said first recording mode at a third speed which is faster than said first speed; and said sub-code data is repeatedly recorded a plurality of times in each of many parallel tracks formed by said rotary head at a third area extending in the lengthwise direction of said tape-shaped recording medium and in parallel to said first and second areas.

7. An apparatus according to claim 5, wherein said plurality of modes further includes a search mode in which: said transport means transports said tape-shaped recording medium at a fourth speed which is faster than said second speed; and said rotary head reproduces at least a part of said sub-code data from said second area.

8. An apparatus according to claim 7, further comprising: designating means for designating a desired address in response to a manual operation; and detection means for detecting that an address searched in said search mode coincides with the desired address designated by said designating means, said mode changeover means being arranged to cancel said search mode in accordance with an output of said detection means.

9. An apparatus according to claim 5, wherein said plurality of modes further includes a reproduction mode in which: said transport means transports said tape-shaped recording medium at said first speed; and said rotary head reproduces said main data from said first area and reproduces at least a part of said sub-code data from said second area.

10. An apparatus according to claim 9, further comprising: detection means for detecting that said sub-code data reproduced from said second area in said reproduction mode has changed, said mode changeover means being arranged to cancel said reproduction mode in accordance with an output of said detection means.

11. An apparatus according to claim 1, wherein said main data is recorded in said first recording mode by using a first clock signal, and said sub-code data is recorded in said second recording mode by using a second clock signal having a frequency set to have the same wave length as said first clock signal on said recording medium.

12. An apparatus according to claim 1, wherein said transport means is arranged to transport said tape-shaped recording medium at a first speed in said first recording mode, and said plurality of modes further includes a search mode in which said transport means transports said tape-shaped recording medium at a second speed which is faster than said first speed and said rotary head reproduces at least a part of said sub-code data from said second area.

13. A data recording apparatus comprising:
a) a cylinder member provided with a rotary head;
b) transport means for transporting a tape-shaped recording medium in the lengthwise direction thereof, said tape-shaped recording medium being wrapped round said cylinder member;
c) clock signal generating means for generating a master clock signal for determining a frequency of generating digital data; and
d) mode changeover means for changing over said apparatus between a plurality of modes thereof, said plurality of modes including:
a first recording mode in which said transport means transports said tape-shaped recording medium at a first speed, and first digital data formed on the basis of a first clock signal generated by said clock signal generating means is recorded in many parallel tracks formed by said rotary head at a first area extending in the lengthwise direction of said tape-shaped recording medium; and
a second recording mode in which said transport means transports said tape-shaped recording medium at a second speed which is faster than said first speed, and second digital data formed on the basis of a second clock signal generated by said clock signal generating means and having a frequency set to have the same wave length as said first clock signal on said recording medium is recorded in many parallel tracks formed by said rotary head at a second area extending in the lengthwise direction of said tape-shaped recording medium and in parallel to said first area.

14. An apparatus according to claim 13, wherein said first digital data includes main data related to main information, and said second digital data includes sub-code data related to sub-information other than said main information.

15. An apparatus according to claim 13, wherein said plurality of modes includes a third recording mode in which: said transport means transports said tape-shaped recording medium in a direction reverse to a transporting direction of said first recording mode at a third speed which is faster than said first speed; and third digital data is recorded in many parallel tracks formed by said rotary head at a third area extending in the lengthwise direction of said tape-shaped recording medium and in parallel to said first and second areas, said third digital data being formed on the basis of a third clock signal generated by said clock signal generating means and having a frequency set to have the same wave length as said first clock signal on said tape-shaped recording medium.

16. An apparatus according to claim 15, wherein said first digital data includes main data related to main information, and said second and third digital data include sub-code data related to sub-information other than said main information.

17. An apparatus according to claim 13, wherein said plurality of modes further includes a fourth mode in which: said transport means transports said tape-shaped recording medium at a fourth speed which is faster than said second speed; and said rotary head reproduces at least a part of said second digital data from said second area.

18. An apparatus according to claim 13, wherein said plurality of modes further includes a reproduction mode in which: said transport means transports said tape-shaped recording medium at said first speed; and said rotary head reproduces said first digital data from said first area and reproduces at least a part of said second digital data from said second area.

19. A data recording apparatus comprising:
a) a rotary head;
b) transport means for transporting a tape-shaped recording medium in the lengthwise direction thereof; and
c) mode changeover means for changing over said apparatus between a plurality of modes thereof, said plurality of modes including:
a first recording mode in which main data related to main information is recorded by said rotary head in a first area extending in the lengthwise direction of said tape-shaped recording medium and said transport means transports said tape-shaped recording medium at a first speed; and
a second recording mode in which sub-code data related to sub-information is recorded by said rotary head in a second area extending in a lengthwise direction of said tape-shaped recording medium and in parallel to said first area, and said transport means transports said tape-shaped recording medium at a second speed which is faster than said first speed.

20. An apparatus according to claim 19, wherein said plurality of modes further includes a third recording mode in which: said transport means transports said tape-shaped recording medium in a direction reverse to a transporting direction of said first recording mode at a third speed which is faster than said first speed; and said sub-code data is repeatedly recorded by said rotary head at a third area extending in the lengthwise direction of said tape-shaped recording medium and in parallel to said first and second areas.

21. An apparatus according to claim 19, wherein said plurality of modes further includes a search mode in which: said transport means transports said tape-shaped recording medium at a fourth speed which is faster than said second speed; and said rotary head reproduces at least a part of said sub-code data from said second area.

22. A data recording apparatus comprising:
a) head means;
b) transport means for transporting a tape-shaped recording medium in the lengthwise direction thereof; and
c) mode changeover means for changing over said apparatus between a plurality of modes thereof, said plurality of modes including:
a first recording mode in which main data related to main information is recorded by said head means, and said transport means transports said tape-shaped recording medium at a first speed; and
a second recording mode in which sub-code data related to sub-information is recorded by said head means, and said transport means transports said tape-shaped recording medium at a second speed which is faster than said first speed.

23. A data recording apparatus comprising:
a) head means;
b) transport means for transporting a tape-shaped recording medium in a lengthwise direction thereof; and
c) mode changeover means for changing over said apparatus between a plurality of modes thereof, said plurality of modes including:
   a first recording mode in which first data is recorded by said head means in a first area extending in the lengthwise direction of said tape-shaped recording medium; and said transport means transports said tape-shaped recording medium at a first speed; and
   a second recording mode in which second data is recorded by said head means in a second area extending in the lengthwise direction of said tape-shaped recording medium and in parallel to said first area, and said transport means transports said tape-shaped recording medium at a second speed which is faster than said first speed.

* * * * *

UNITED STATES PATENT AND TRADEMARK OFFICE
CERTIFICATE OF CORRECTION

PATENT NO. : 5,194,997

DATED : March 16, 1993

INVENTOR(S) : Susumu Kozuki, et al.

It is certified that error appears in the above-identified patent and that said Letters Patent is hereby corrected as shown below:

| | |
|---|---|
| Col. 1, line 23 | Change "of" to -- for -- |
| Col. 3, line 61 | Change "&he" to -- the -- |
| Col. 4, line 36 | Change "sib" to -- sub -- |
| Col. 4, lines 50, 54, 58 | Change "γo" to --νo -- |
| Col. 5, line 54 | Change "γo" to --νo -- |
| Col. 5, line 57 | Change "γ" to --ν -- |
| Col. 6, line 22 | Change "nγo" to -- nνo -- |
| Col. 6, line 47 | Change "γo" to -- νo -- |
| Col. 6, line 65 | Change "mγo" to -- mνo -- |
| Col. 7, line 4 | After "o" - insert a -- . -- |
| Col. 7, lines 23, 38, 47, 51 | Change "γ" to --ν -- |
| Col. 8, lines 9, 10 | Change "γo" to --νo -- |
| Col. 8, lines 37, 45, 54, 57 (both occurences). | Change "γ" to --ν-- |
| Col. 9, lines 14, 15, 17, 18, 22, 28, 34, 35, 37, 45, 46, 51, 52 | Change "γ" to --ν-- |

UNITED STATES PATENT AND TRADEMARK OFFICE
CERTIFICATE OF CORRECTION

PATENT NO. : 5,194,997
DATED : March 16, 1993
INVENTOR(S) : Susumu Kozuki, et al.

It is certified that error appears in the above-identified patent and that said Letters Patent is hereby corrected as shown below:

| | |
|---|---|
| Col. 11, line 62 | Change "irrespectively" to -- irrespective -- |
| Col. 12, line 22 | After "data." insert -- the -- and change "Re-" to -- re- -- |
| Col. 12, line 35 | Change "1" to -- $\ell$ -- |
| Col. 13, line 38 | After "times" insert -- , -- |
| Col. 13, line 45 | Change "7.5" to -- 27.5 -- and change "yo" to -- $\sqrt{o}$ -- |
| Col. 13, line 57 | Change "round" to -- around -- |
| Col. 15, line 17 | Change "round" to -- around -- |
| Col. 16, line 63 | Change "means." to -- means,-- |

Signed and Sealed this

Twenty-first Day of December, 1993

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,194,997

DATED : March 16, 1993

INVENTOR(S) : Susumu Kozuki, Katsuji Yoshimura and Toshiyuki Masui

It is certified that error appears in the above-identified patent and that said Letters Patent is hereby corrected as shown below:

ON THE TITLE PAGE:

[Item 63]. Change "Oct. 10, 1988," to -- Oct. 3, 1988 --

Signed and Sealed this

Twenty-fifth Day of January, 1994

Attest:

BRUCE LEHMAN

Attesting Officer

Commissioner of Patents and Trademarks